US009361400B2

(12) United States Patent
Zhao et al.

(10) Patent No.: US 9,361,400 B2
(45) Date of Patent: Jun. 7, 2016

(54) METHOD OF IMPROVED HIERARCHICAL XML DATABASES

(75) Inventors: Leo Lilin Zhao, San Jose, CA (US); Jang Fung Chen, Cupertino, CA (US); Joseph Werner De Vocht, Elk Grove, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 1537 days.

(21) Appl. No.: 12/249,358

(22) Filed: Oct. 10, 2008

(65) Prior Publication Data

US 2009/0313288 A1 Dec. 17, 2009

Related U.S. Application Data

(60) Provisional application No. 60/979,559, filed on Oct. 12, 2007.

(51) Int. Cl.
*G06F 17/30* (2006.01)

(52) U.S. Cl.
CPC ................................ *G06F 17/30923* (2013.01)

(58) Field of Classification Search
CPC ................................................ G06F 17/30923
USPC ................................................. 707/804, 803
See application file for complete search history.

(56) References Cited

U.S. PATENT DOCUMENTS

| | | | | |
|---|---|---|---|---|
| 7,487,168 | B2 * | 2/2009 | Rys et al. | 707/101 |
| 2003/0078902 | A1 * | 4/2003 | Leong et al. | 706/59 |
| 2003/0182626 | A1 * | 9/2003 | Davidov et al. | 715/513 |
| 2004/0019589 | A1 * | 1/2004 | Basrur | 707/3 |
| 2004/0088320 | A1 * | 5/2004 | Perry | 707/103 R |
| 2005/0097128 | A1 * | 5/2005 | Ryan et al. | 707/103 Y |
| 2006/0230010 | A1 * | 10/2006 | Aggour et al. | 706/62 |
| 2006/0277158 | A1 * | 12/2006 | Kim | 707/2 |
| 2008/0301171 | A1 * | 12/2008 | Owen et al. | 707/102 |

FOREIGN PATENT DOCUMENTS

| | | | |
|---|---|---|---|
| JP | 2001-147934 | A | 5/2001 |
| JP | 2001-282727 | A | 10/2001 |
| JP | 2005-521159 | T | 7/2005 |
| JP | 2007-164630 | A | 6/2007 |

OTHER PUBLICATIONS

Vivek Shaiva,"Designing Adaptive Components for a Service Oriented Architecture", 2003, IEEE.*
Wolfgang Meier, "eXist: An Open Source Native XML Database", 2002.*
Yokoyama et al.,"An access method based on the prefix labeling scheme for XML repositories", 2005.*
Schuhart et al., "XCG: A One-To-One Class Generator for XML Languages", 2005, IADIS AC'05.*
Japanese Office Action mailed Feb. 14, 2011 in corresponding Japanese Patent Application No. 2008-265037.
Kojiro Nakayama et al., "The Processing Methods for the Partially Encrypted Data in Multi-hop Web Services," Institute of Electrical Engineers of Japan, vol. 127, No. 6, pp. 951-956 (Jun. 1, 2007).
Akinobu Yoshida,"Java & XML Collaboration in the Near Future—Introduction to JAXP JAXB JAXM," Java World, vol. 5, No. 10, pp. 197-206 (Oct. 1, 2001).

* cited by examiner

*Primary Examiner* — Mariela Reyes
*Assistant Examiner* — Dawaune Conyers
(74) *Attorney, Agent, or Firm* — Pillsbury Winthrop Shaw Pittman LLP

(57) ABSTRACT

A method is provided for initializing an XML database. The method includes the steps of parsing an XML file to extract a plurality of records, the records arranged in a hierarchical form, creating, for each record, a plurality of class objects, each class having associated therewith one or more attributes, and creating a plurality of handling methods for each of one or more attributes associated with each class object, the handling methods defining how the database can be accessed.

13 Claims, 6 Drawing Sheets

100

```
<record name-"Design">
        <child guitag="Design Layer">>
                DesignLayer
</child>

        <field name-"name">
        <type>string</type>
        <value></value>
        <comment>Current design name.</comment>
</field>

<field name="filename">
    <type>string</type>
    <value></value>
    <comment>Full path to file name that was imported.</comment>
</field>

...

<field name="unit_design">
    <atype>unitLength</atype>
    <type>double</type>
    <value>0.0</value>
    <comment>Design unit of measure</comment>
</field>
</record>

<record name-"DesignLayer">
  <fieldname-"name">
    <type>string</type>
    <value></value>
    <comment>User definable name.</comment>
  </field>

   ...

  <field name="drawmode">
    <type>unit</type>
    <value>0</value>
    <comment>Outline, pattern fill solid fill.</comment>
  </field>
</record>
```

METHOD OF IMPROVED HIERARCHICAL XML DATABASES

CROSS-REFERENCE TO RELATED APPLICATIONS

The present application claims priority from U.S. Prov. Appln. No. 60/979,559, filed Oct. 12, 2007, the contents of which are incorporated herein by reference in their entirety.

FIELD OF THE INVENTION

The present invention relates generally to database storage, and more particularly to creating and using a hierarchical extensible markup language (XML) database.

BACKGROUND OF THE INVENTION

Many software applications require intensive data handling. Typically, a database, such as a structured query language (SQL) database, is used to store the necessary data. In many applications, a user must initialize and start the database prior to running the application. SQL databases are well known for standard data storage and handling. However, many drawbacks exist when using the typical relational SQL databases.

One such drawback arises from the requirement of many applications that the database be loaded/created prior to starting the application program. Running both the database and the application program simultaneously causes heavy CPU demands and uses large amounts of memory resources. This can often cause the operation of the application program to slow down.

Furthermore, with each new software release, software developers must create new SQL scripts to upgrade the associated database. This creates a significant amount of extra work and often the upgrade can be very difficult as well as time consuming and costly. For example, if a user wishes to add a new column to one database table, the user must ensure the integrity of related table data. Such a process is prone to introducing software bugs.

Extensible markup language (XML) is becoming increasingly popular for data storage and manipulation. XML provides a common syntax for expressing data in a hierarchical manner. Relational databases are known types of databases which organize a collection of data items as a set of formally-described tables from which data can be accessed and reassembled. However, typical SQL based relational databases are unable to efficiently handle the XML data format.

Accordingly, there exists a need for a database to efficiently handle the XML data format.

SUMMARY OF THE INVENTION

The present invention provides a database and a method of utilizing a database which overcomes the foregoing problems, among others. More specifically, the present invention provides a system and method for creating an XML hierarchical database to store and handle XML data, in which an XML file may be used to describe the hierarchical relationships among the data objects. Classes and methods of accessing and handling the objects and their attributes in the XML database may be generated by parsing the XML file.

In accordance with an exemplary embodiment, a computer-implemented method of initializing an XML database is provided which comprises parsing an XML file to extract a plurality of records, the records arranged in a hierarchical form, creating, for each record, a plurality of class objects, each class having associated therewith one or more attributes, and creating a plurality of handling methods for each of one or more attributes associated with each class object, the handling methods defining how the database can be accessed.

As a result of the method of the present invention, it is possible to provide an XML database that does not have to be initialized prior to running an associated application program. Additionally, the XML database of the present invention may be easily upgraded with new database data and an XML schema. Furthermore, logical data is easily bundled which aids in data sharing and reusing.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 2A depicts an exemplary XML file that can be utilized in accordance with the present invention.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
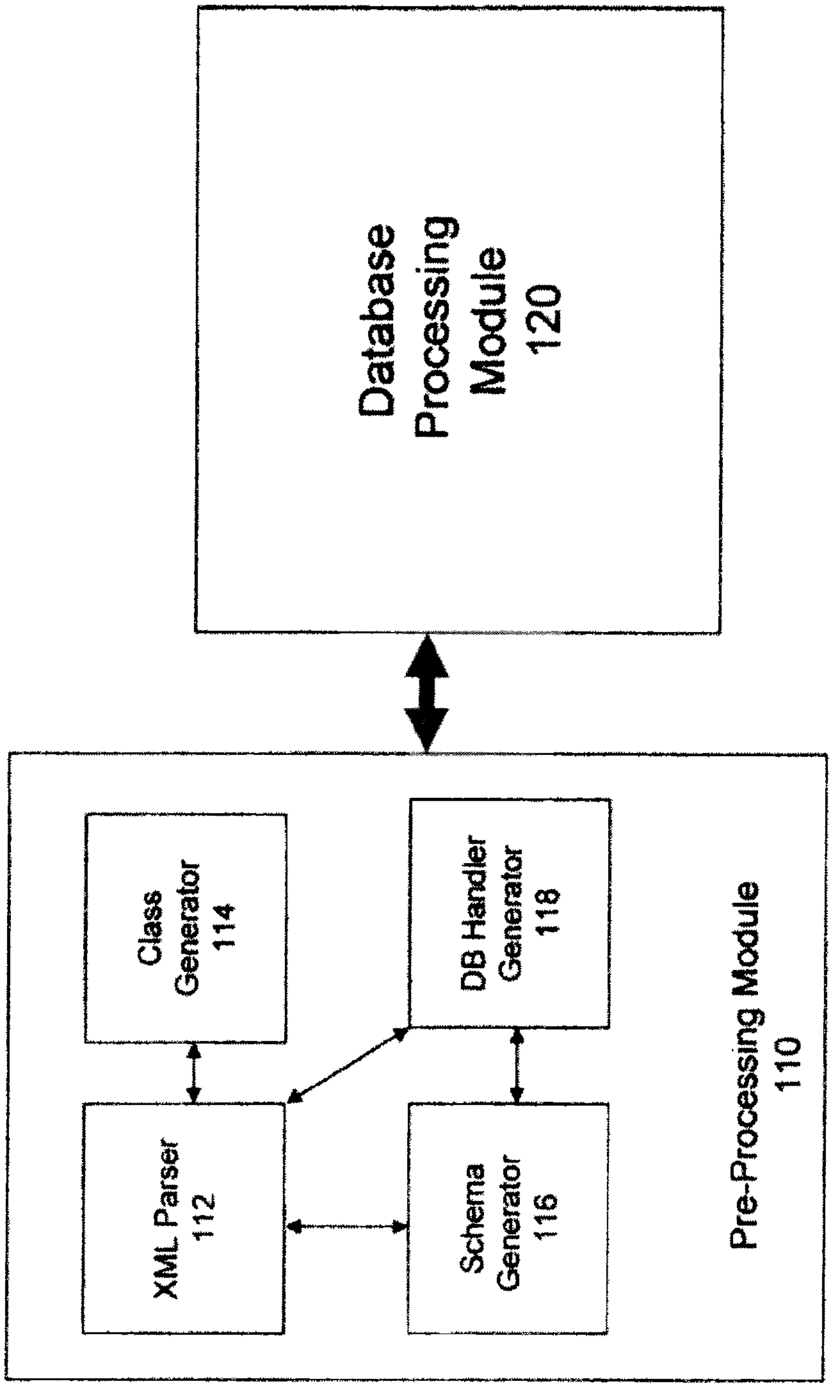
FIG. 1 depicts an exemplary block diagram of a system for generating an XML database.

A system and method of generating an XML database and handling XML database objects is described herein. FIG. 1 depicts a system 100 which may be used in accordance with various disclosed embodiments. System 100 may include a pre-processing module 110 configured to define a database and the methods for accessing data stored in the database, and database processing module 120 configured to manipulate the data when using an application program. Pre-processing module 110 and/or database processing module 120 may be integrated within an application program, or may be accessed by the application program as needed. Pre-processing module 110 and database processing module 120 may be stored in a computer memory, or may be implemented as part of a computer's central processing unit (CPU).

Pre-processing module 110 may include a plurality of pre-processing sub-modules, such as, for example but not limited to, XML parser 112, class generator 114, schema generator 116, and database handler generator 118. One or more XML files may be provided which define the logical relationship among database objects. That is, in creating an XML database, the relationship among the objects to be stored in the database may be defined by an XML file. XML parser 112 may be configured to parse the XML file. Any parser capable of parsing an XML file may be used, such as, for example, the open source Xerces API.

Class generator 114 may be configured to generate class objects for each record in the XML file. Schema generator 116 may be configured to generate an XML schema from the XML file. A schema defines the structure of an XML document. It may be used to ensure that data extracted from a database corresponds to the proper structure. Handler generator 118 may be configured to define one or more handlers for automatically processing data. Handlers may include, for example, programs or routines to automatically extract data from an XML database or store data to the database.

For each hierarchical object tree, database handler generator 118 generates a handler class which is stored in a source file and a hard file in a build directory to set up for the build process. In a top record class generated by class generator 114, the corresponding handler class is used for reading and parsing the data in the XML database.

Once an XML file has been pre-processed to format a database, data within the database may be accessed via database module 120. Using the handlers created by handler generator 118, database module 120 can automatically retrieve, store, or otherwise process data stored in the database as needed by an application program. For example, when an application is being started, the parser, the database handlers, classes, and their corresponding functions as well as the XML schema are used for loading the data from the XML files into the database.

The parser and database handlers are used for parsing the XML files to get the needed data from them. An XML schema is used to ensure that the XML file formats are correct and therefore making sure the database isn't corrupted. Classes and their corresponding functions are used for storing the data in data containers, for example, as vectors in a class object.

FIG. 2A illustrates an example of a portion of an XML file 200. As shown, XML file 200 includes a record 201 named "Design" which has a child record 203 "Design Layer". The record 201 "Design" has associated with it a plurality of attributes, for example but not limited to, records defining a name, filename, format, design unit, and/or other records. Child record "Design Layer" also has a plurality of attributes associated with it, including but not limited to name, color_idx, fill_idx, and drawmode. Each attribute is used to describe an XML element in an XML file and to provide additional information about the record.

Figure 2B:
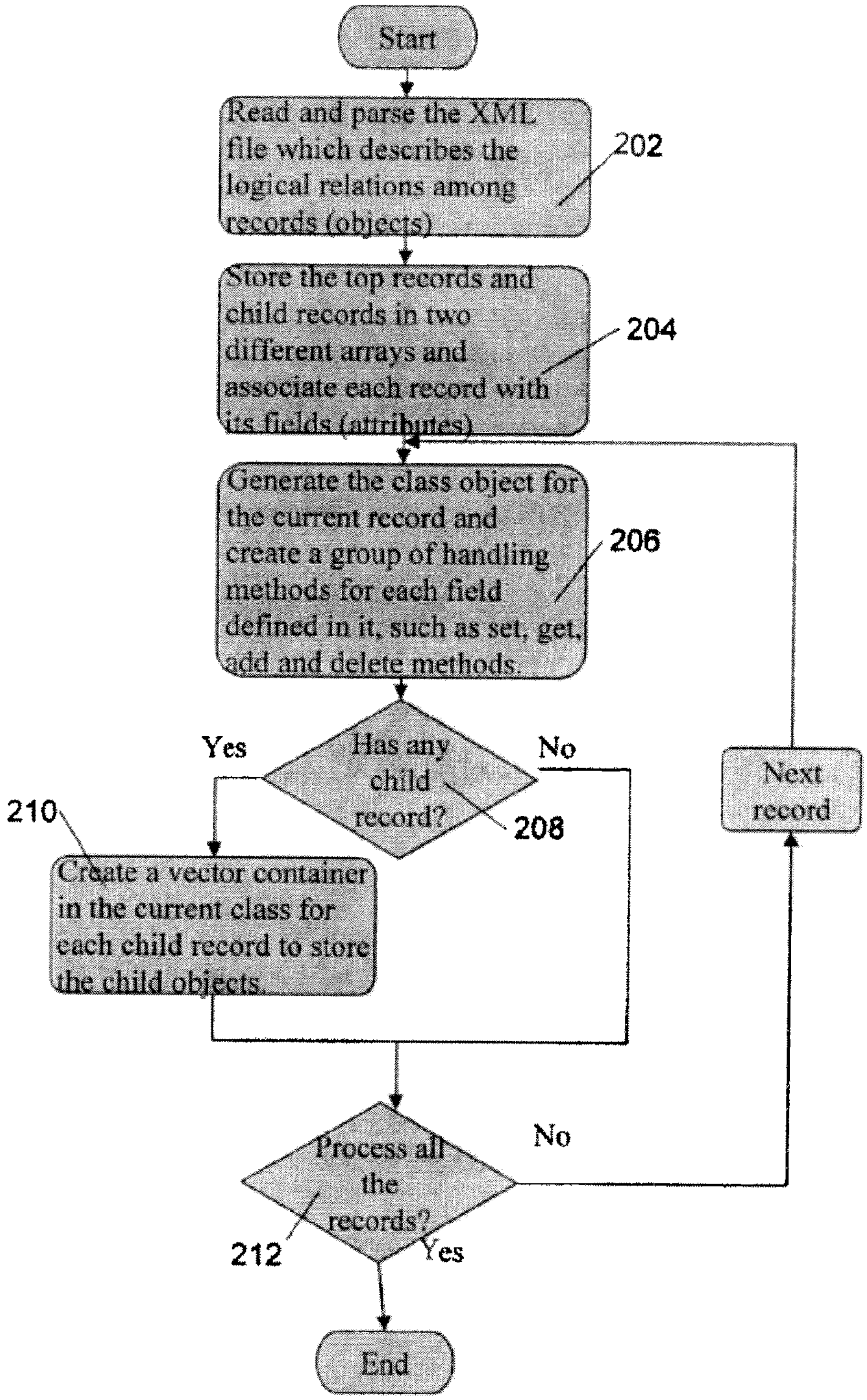
FIG. 2B depicts an exemplary method of parsing an XML file such as that in FIG. 2A.

FIG. 2B illustrates a method of generating code to access and handle objects and their attributes in an XML database. The method includes pre-processing an XML file, such as the XML file 200 depicted in FIG. 2A, to organize the data. As depicted at 202, the XML file is read and parsed using, for example, the parser described above in reference to FIG. 1. The XML file describes the logical relationship among the records defined in the file. This includes, for example, parent-child relationships, sibling relationship, dependencies, and/or other relationships. Parsing is performed in order to extract the key portions of the XML file. For example, in some embodiments, a parser may be configured only to extract top level parent elements. The parser may be configured by an administrator to extract predefined data from an XML file.

As depicted at 204, each top level or parent record and any child records are stored in arrays. The records may be stored in different arrays. In the example XML file depicted in FIG. 2A, top level record 201 "Design" would be stored in an array and child record 203 "Design Layer" would be stored in a separate array. Additionally, the attributes associated with each top level and/or child record are stored in the member variables of a corresponding class object.

Next, as depicted at 206, a class object is generated for each top record. For example, a class object may be created for the Design record. A group of handling methods for each field or attribute associated with the class object may also be created. Handling methods may include, for example, methods to perform set, get, add, delete, search by name and/or other operations on the data stored in a database for each attribute. Using the Design record example, handling methods may be generated to get, set, add, or delete a name, filename, format, etc. The handling methods may be performed by an application program, as needed.

An XML schema may also be generated representing each hierarchical object tree. The schema is used to ensure data integrity in the database. Schema generation is described in more detail in reference to FIG. 3.

Next, as depicted at 208, the method determines whether there are any child records associated with the record currently being processed. If there are child records, a vector container is created in the current class object to store the child objects, as depicted at 210. If there are no child records, or if there are child records and a vector container has been created, the method determines whether all records have been processed, as depicted at 212. If additional records are present, the method returns step 206 to generate a class object for the next record. Otherwise, the process is complete resulting in an empty XML database structure.

Figure 3:
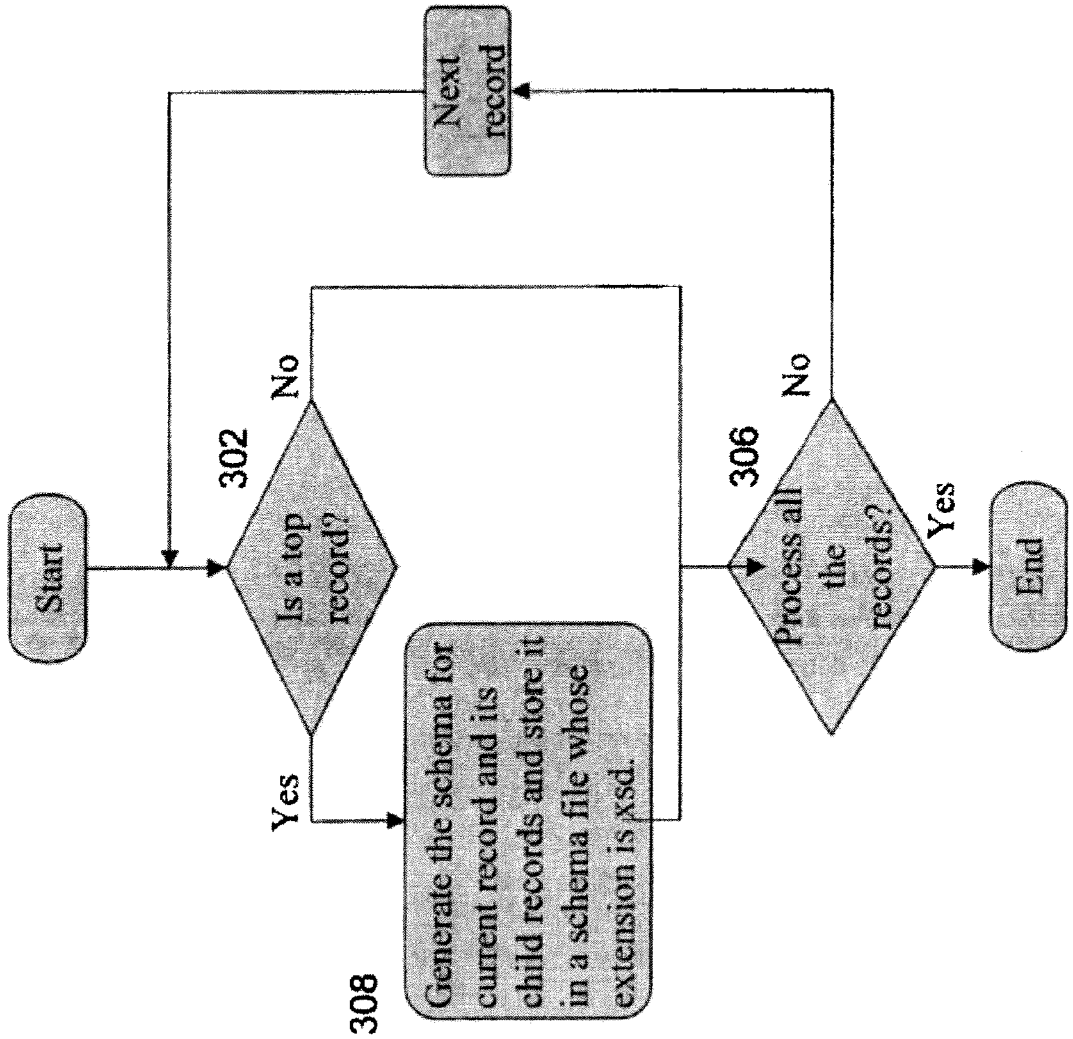
FIG. 3 depicts an exemplary method of generating code to access an XML database.

FIG. 3 depicts, in greater detail, an exemplary method of generating an XML schema from an XML file. As described above, the schema may be used to ensure data integrity in the database. When reading data from the database, if the data is not consistent with the corresponding schema, a warning or error message may be presented. A schema check can be performed when reading and parsing data from the XML database using the generated database handlers. Additionally, the schema, along with new XML data, is used to upgrade an old database.

As depicted at 302, for each stored record, the method determines whether the record is a top or parent record. For each top record, a corresponding XML schema is generated to describe and define the hierarchical tree starting from the class mapped to the top record. A database handler class is generated for each top record If the record is not a top record, the method checks for other records, as depicted at 306. If the record is a top record, a schema may be generated for the current record and its child records, as depicted at 308. The schema may be stored in a schema file.

XML data may include data contained in files of different file formats. As depicted in XML file 200 of FIG. 2A, the Design record includes a filename element which refers to the full path to the file that is to be imported, and a format element describing the file format. Depending on the type of application, some files may be very large. For example, image files such as .gds and .jpg files as well as some word processor files (i.e., .doc files) may be large. In accordance with some embodiments, the files referenced in an XML file may be stored separately and loaded on demand. That is, the XML files may be stored in one directory while non-XML files are stored in a separate directory. When an application program requests one of the non-XML files, the file is loaded. In some embodiments, the file remains loaded until the program session ends. In other embodiments, the file may remain loaded for a predetermined amount of time, or until it is no longer being used.

Compression may also be used in order to save disk space when large files are referenced in an XML file. The files may be decompressed to a temporary directory when needed. In some embodiments, data encryption may also be performed to protect sensitive data in an XML file.

Figure 4:
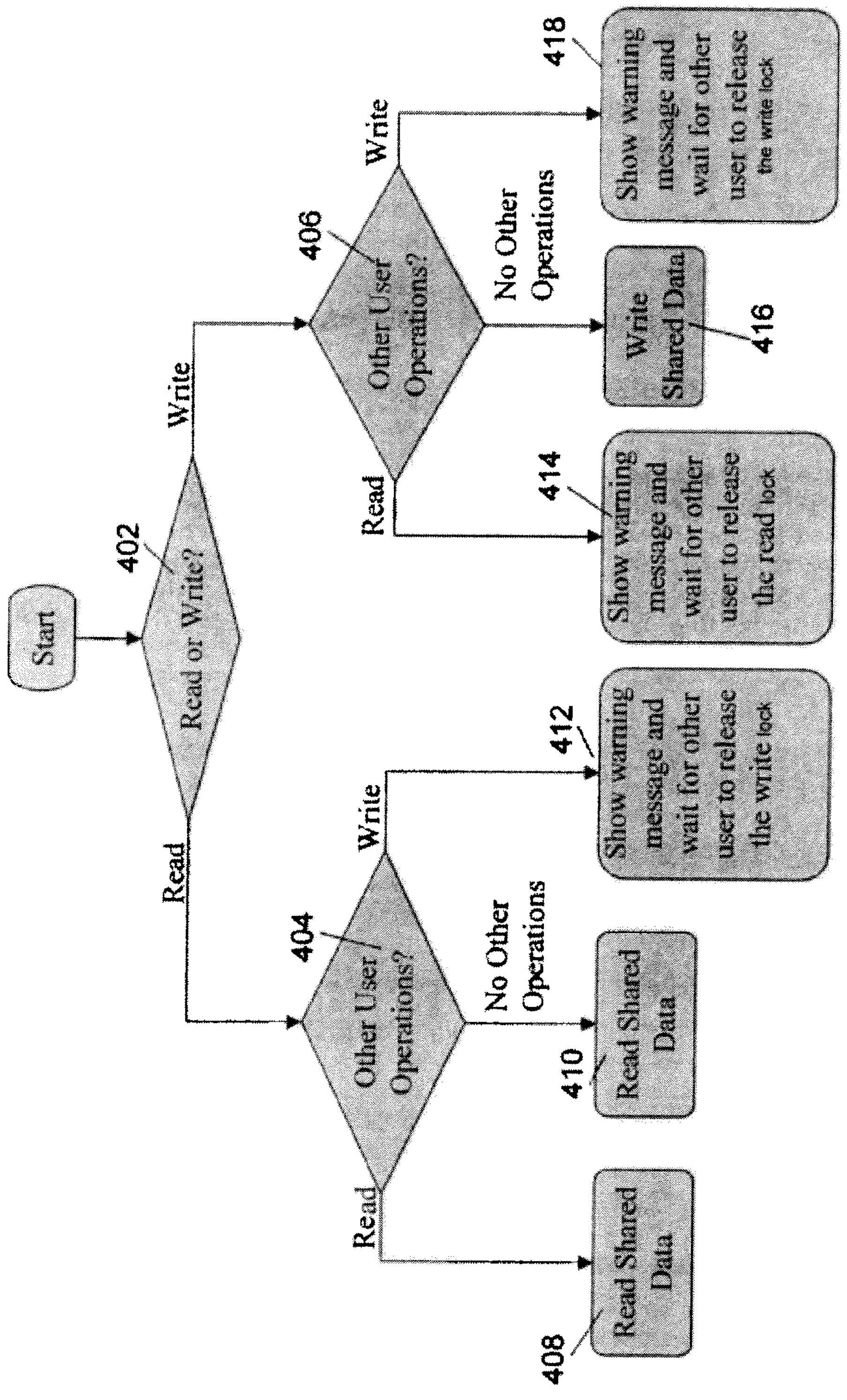
FIG. 4 depicts an exemplary method of determining data access permissions in accordance with the present invention.

Because data stored in an XML database may be accessed by multiple users, read and write access controls may be implemented to ensure the data does not become corrupt. For example, controls may be implemented such that two users can concurrently read data from a database, but one user cannot update data which is being concurrently read by another user. FIG. 4 depicts one example of determining how data can be shared. Other rules may be implemented.

As depicted at 402, a determination is made as to whether a first user is attempting a read or a write operation. As depicted at 404 and 406, a determination is made as to whether a second user is also performing an operation on the same data, for the case of a read or a write operation, respectively. If a second user is performing a read operation, the first user may also be permitted to read the data, as depicted at 408. Similarly, if no other operations are being performed by a second user, the first user may be permitted to read the data, as depicted at 410. If, however, a second user is performing a write operation, the first user may receive a warning message, as depicted at 412, and may be required to wait for the second user to complete the write operation before having access to the requested data.

If the first user has requested a write operation, and a determination is made that a second user is also performing a read operation on the same data, the first user may receive a warning message and may be required to wait until the second user has completed the read operation before being able to write the data, as depicted at 414. Similarly, if the second user is already performing a write operation, the first user may receive a warning message, as indicated at 418. If, however, no other operation is being performed on the requested data by a seco~ldu ser, the first user may write the data, as depicted at 416.

Figure 5:
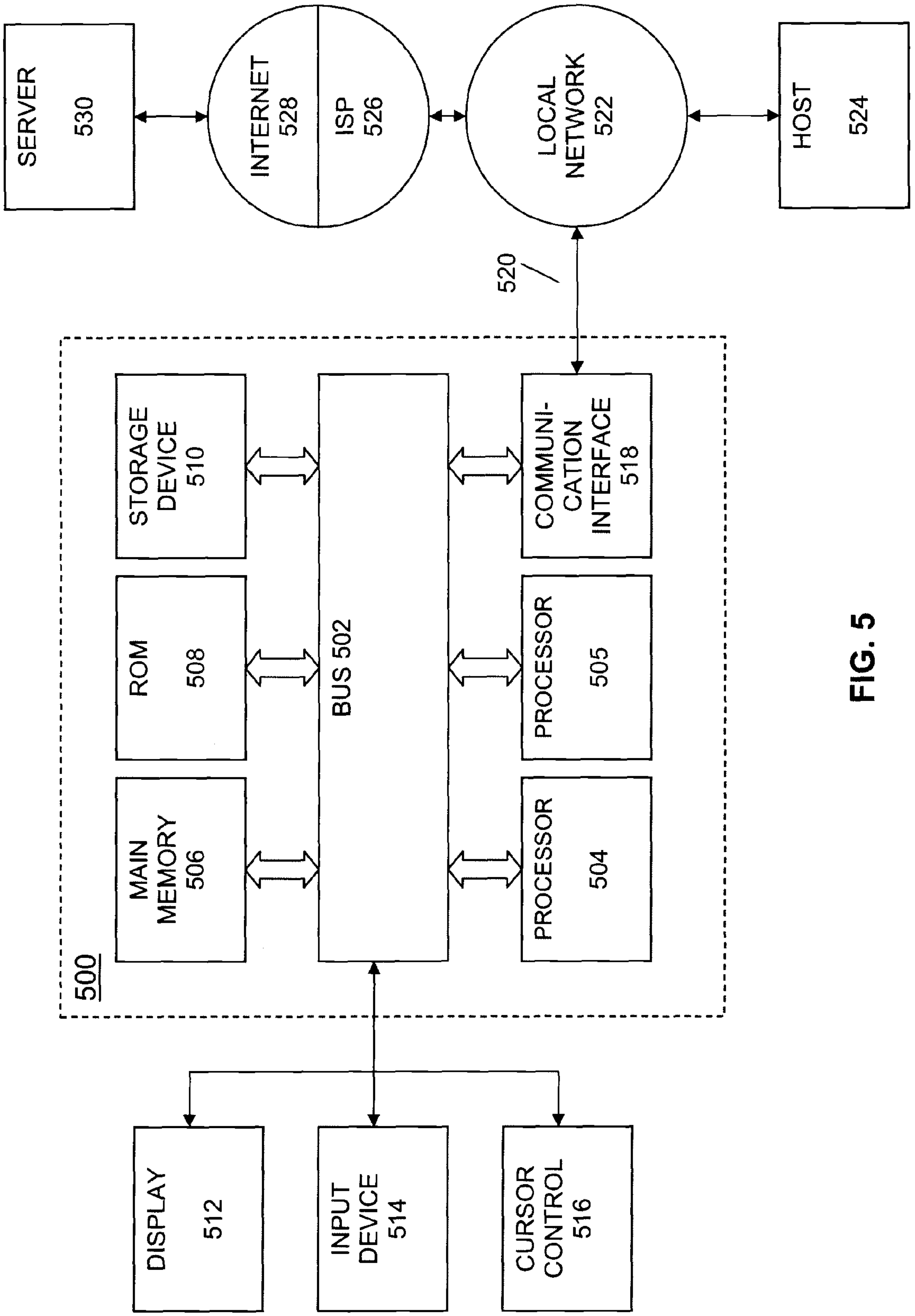
FIG. 5 depicts an exemplary block diagram of a computer system which can utilize and/or implement the XML database of the present invention.

FIG. 5 is a block diagram that illustrates an example of a computer system 500 which can utilize and/or implement the XML database detailed above. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or flat panel or touch panel display for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. A touch panel (screen) display may also be used as an input device.

The term "computer-readable medium" as used herein refers to any medium that participates in providing instructions to processor 504 for execution. Such a medium may take many forms, including but not limited to, non-volatile media, volatile media, and transmission media. Non-volatile media include, for example, optical or magnetic disks, such as storage device 510. Volatile media include dynamic memory, such as main memory 506. Transmission media include coaxial cables, copper wire and fiber optics, including the wires that comprise bus 502. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also preferably includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network, now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520, and communication interface 518. In the Internet example, a server 530 might transmit a requested code for an application program through Internet 528, ISP 526, local network 522 and communication interface 518. In accordance with the invention, one such downloaded application provides for the illumination optimization of the embodiment, for example. The received code may be executed by processor 504 as it is received, and/or stored in storage device 510, or other non-volatile storage for later execution. In this manner, computer system 500 may obtain application code in the form of a carrier wave.

The present invention provides numerous advantages over the prior art. Most importantly, the present invention provides an XML database that efficiently handles XML data and a hierarchical data structure, is easily upgradeable, and does not require pre-initialization before being used by an application program. By using an XML file to describe the logical relations among the objects (records), the corresponding classes and functions to handle data are automatically generated. Database handlers and schema are also generated automatically to read, parse, and write data between an application and an XML database, saving considerable development time. When logical relations among the objects are changed, the new classes, functions, database handlers, and schema are generated accordingly and automatically, avoiding human error which often occur when manually changing relationships.

Data in the database can be easily bundled according to their logical relations, for data reusing and sharing. This provides a great improvement over typical SQL database, wherein such an operation is virtually impossible. The XML database described herein is more reliable compared with an SQL database. The data in an SQL database is stored in binary files whose format is unknown to a user. Accordingly, when an SQL database becomes corrupt, there is no way to recover the users' important. In the XML database described herein, all data are stored in plain text XML files in a well-formatted hierarchical form. Users can spot and fix a corrupt file easily by opening and editing it using any known text editor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims.

What is claimed is:

1. A non-transitory computer-readable medium having stored therein a set of instructions, which when executed by a computer, cause the computer to perform a method of initializing an extensible markup language (XML) database, the method comprising:

- dynamically generating an empty structure for the XML database and code to access and handle objects in the XML database, the dynamically generated XML database structure and code corresponding to an XML file, the dynamically generating comprising:
  - parsing the XML file to extract a plurality of records therefrom, the records arranged in a hierarchical form;
  - creating, for each record extracted from the XML file, a corresponding class that defines a part of the empty structure for the XML database, each class having associated therewith one or more attributes of the each record; and
  - creating a plurality of handling methods for each of one or more attributes associated with each object within a class, the handling methods defining how data associated with the attributes can be accessed in the database.

2. The non-transitory computer-readable medium of claim 1, wherein the method further comprises:

- generating an XML schema representing the hierarchical relationship among the records.

3. The non-transitory computer-readable medium of claim 1, wherein at least one of the one or more attributes describes a filename, and the file associated with the filename is stored in a separate directory than the XML file.

4. The non-transitory computer-readable medium of claim 1, wherein the plurality of class objects include at least one parent object.

5. The non-transitory computer-readable medium of claim 1, wherein the method further comprises:

- determining whether a class object is a parent class, and for each parent class, creating a vector container in the class object to store the associated child objects.

6. The non-transitory computer-readable medium of claim 1, wherein the XML file is encrypted.

7. A method of initializing an extensible markup language (XML) database, the method comprising:

- dynamically generating an empty structure for the XML database and code to access and handle objects in the XML database, the dynamically generated XML database structure and code corresponding to an XML file, the dynamically generating comprising:
  - parsing the XML file to extract a plurality of records therefrom, the records arranged in a hierarchical form;
  - creating, for each record extracted from the XML file, a plurality of class objects defining part of the structure for the XML database, each class having associated therewith one or more attributes of the each record; and
  - creating a plurality of handling methods for each of one or more attributes associated with each object within a class, the handling methods defining how data associated with the attributes can be accessed in the database.

8. The method of claim 7, further comprising:

generating an XML schema representing the hierarchical relationship among the records.

9. The method of claim 7, wherein at least one of the one or more attributes describes a filename, and the file associated with the filename is stored in a separate directory than the XML file.

10. The method of claim 7, wherein the plurality of class objects include at least one parent object and one child object.

11. The method of claim 7, further comprising:

determining whether a class object is a parent class, and for each parent class, creating a vector container in the class object to store the associated child objects.

12. The method of claim 7, wherein the XML file is encrypted.

13. A system comprising a computer that executes the instructions stored in the non-transitory computer-readable medium of claim 1.

* * * * *